United States Patent
Matsuki et al.

[11] Patent Number: 6,033,770
[45] Date of Patent: Mar. 7, 2000

[54] POLYPROPYLENE RESIN CELLULAR MOLDED ARTICLE HAVING A SKIN AND PRODUCTION METHOD THEREFOR

[75] Inventors: Kiyoshi Matsuki, Nishinomiya; Izumi Ibata, Osaka, both of Japan

[73] Assignee: Kanegafuchi Kagaku Kogyo Kabushiki Kaisha, Osaka, Japan

[21] Appl. No.: 08/863,695

[22] Filed: May 27, 1997

Related U.S. Application Data

[62] Continuation of application No. 08/482,470, Jun. 7, 1995, abandoned, which is a division of application No. 08/167,826, filed as application No. PCT/JP93/00528, Apr. 23, 1993, Pat. No. 5,474,841.

[30] Foreign Application Priority Data

| Apr. 23, 1992 | [JP] | Japan | 4-104752 |
| Apr. 23, 1992 | [JP] | Japan | 4-104753 |
| Jun. 4, 1992 | [JP] | Japan | 4-144310 |
| Jun. 4, 1992 | [JP] | Japan | 4-144314 |
| Jun. 4, 1992 | [JP] | Japan | 4-144316 |
| Oct. 7, 1992 | [JP] | Japan | 4-268774 |

[51] Int. Cl.$^7$ .................................................. B32B 3/26
[52] U.S. Cl. ............... 428/309.9; 428/132; 428/317.1; 428/318.6; 428/319.9
[58] Field of Search .................. 428/71, 132, 309.9, 428/318.6, 318.8, 319.7, 319.9, 319.3, 313.5, 317.1

[56] References Cited

U.S. PATENT DOCUMENTS

| 3,213,071 | 10/1965 | Campbell | 428/318.6 X |
| 3,645,837 | 2/1972 | Chisholm et al. | 428/319.9 X |
| 3,764,642 | 10/1973 | Boutilier | 428/318.8 X |
| 3,767,742 | 10/1973 | Robin | 428/318.8 X |
| 4,766,031 | 8/1988 | Kohl | 428/317.9 |
| 4,777,000 | 10/1988 | Kuwabara et al. | 264/51 |
| 4,891,081 | 1/1990 | Takahashi et al. | 428/318.8 X |
| 5,073,444 | 12/1991 | Shanelec | 428/313.5 |
| 5,085,814 | 2/1992 | Kamiyama et al. | 264/126 |
| 5,196,151 | 3/1993 | Sakaida et al. | 264/46.7 |

FOREIGN PATENT DOCUMENTS

| 477 476 | 4/1992 | European Pat. Off. . |
| 63-126739 | 5/1988 | Japan . |
| 4-119828 | 4/1992 | Japan . |

*Primary Examiner*—Blaine Copenheaver
*Attorney, Agent, or Firm*—Armstrong, Westerman, Hattori, McLeland & Naughton

[57] ABSTRACT

A cellular molded article (11) of a polypropylene resin having a skin (8) was produced by placing a skin material (8) on the interior surface of a die A (13), clamping the die A (13) with a die B (14) to form a mold (7), then charging the mold (7) with pre-expanded particles of a polyethylene resin, pre-heating the pre-expanded particles using steam supplied through the vapor holes (4) of the die B (14) at a temperature lower than the temperature at which the pre-expanded particles are melt bonded together, then holding to the pre-expanded particles in said steam, and next performing the main heating of the pre-expanded particles through the die B (14) at a temperature not less than the temperature at which the pre-expanded particles are melt bonded together. At the time of the main heating of the pre-expanded particles through the die B (14), the die A (13) may also be heated up as needed.

12 Claims, 5 Drawing Sheets

POLYPROPYLENE RESIN CELLULAR MOLDED ARTICLE HAVING A SKIN AND PRODUCTION METHOD THEREFOR

This application is a continuation of application Ser. No. 08/482,470 filed Jun. 7, 1995, now abandoned, which is a division of application Ser. No. 08/167,826 filed Dec. 22, 1993, now U.S. Pat. No. 5,474,841 issued Dec. 12, 1995, which is a § 371 national phase of international application PCT/JP93/00528 filed Apr. 23, 1993.

TECHNICAL FIELD

The present invention relates to a polypropylene resin cellular molded article having a skin, and a production method therefor. More particularly, it relates to a polypropylene resin cellular molded article having an outer skin suitable for use, for example, as an automobile interior trim material or the like, and a production method therefor.

BACKGROUND OF THE INVENTION

Resin cellular molded articles having a skin are used, for example, as materials for automobile interiors or the like. More specifically, examples of automobile interior trim material uses are door material, instrument panel, sun visor, ceiling material, door trim, rear package, knee bolster, air bag door, head rest, arm rest, various pillars, quarter trim, front side trim, front seat back, crash pad, console box, console head, luggage floor cover, partition board, center console, console box cover, and so forth.

Previously, articles such as are formed by pressure molding, in a heat-softened state in a mold, of laminates made by sequentially superimposing an imitation leather sheet such as polyvinyl chloride, a foam sheet such as polypropylene foam and a core material such as ABS resin and binding these together into one unit with adhesive, are known as automobile interior trim materials (Japanese Unexamined Patent Publication (Tokkyo Kokai) No. 54-158471). However, said automobile interior trim material having a foam sheet feels hard to the touch when pressed, and further disadvantages are that the cushioning property is inferior and there is no feeling of depth.

As a means to solve the disadvantages of said automobile interior trim material, a united laminate made by the sequential stacking of an artificial leather sheet made of polyvinyl chloride, a foam sheet such as polypropylene foam, a layer of expanded polyurethane and a core material such as ABS resin is known. As a result of having the intermediate layer of expanded polyurethane, said laminate has both an undoubtedly soft touch given to it when pressed, and an improved cushioning property compared to said automobile interior trim material. However, it is heavier compared to this automobile interior trim material, and moreover, at high temperature a foul odor is emitted due to the polyvinyl chloride, and a further disadvantage is that a harmful gas is produced during burning.

Furthermore, in recent years in the automobile industry, in order to improve the automobile fuel consumption, there has been a great demand for the lightening of automobile constructing parts, and in line with this, still further lightening is being sought. Furthermore, from the viewpoint of the reclamation of resources, the development of an easily recyclable automobile interior trim material is long-awaited. Accordingly, in consideration of said prior art, the present inventors carried out accumulated extensive studies in order to develop an automobile interior trim material which is able to simultaneously satisfy the following numerous demands: (1) a soft and supple feel is given when pressed, (2) the cushioning property is superior, (3) there is a feeling of depth, (4) a foul odor is not produced at high temperature, (5) the amount of noxious gas produced during burning is small, (6) lightening can be promoted, and (7) recycling is easy.

Conversely, a cellular molded article of a polypropylene resin on which is provided a skin material, such as an automobile interior trim material, is produced by a method in which a cellular molded article is fabricated in advance, adhesive, for example, is applied to this and then the skin material is stuck on. However, a disadvantage is that when using this method, since three steps are needed consisting of the fabrication of a molded foam, the application of adhesive and the sticking of the skin material to the molded foam, the manufacturing process is troublesome and the production efficiency is poor.

As a method for solving the disadvantages in the above-mentioned process, a method for manufacturing a unified cellular molded article is known (Japanese Unexamined Publication (Tokkyo Kokai) No.3-190723, and so forth), in which a porous sheet having gas permeability is set up on at least the face having vapor holes of a pair of dies having a plurality of vapor holes, then after charging with expanded particles of a thermoplastic resin, steam is introduced through the vapor holes, and the porous sheet and the expanded particles are melt bonded by heating.

A problem with the aforesaid production method of a cellular molded article is that, while the method is effective when the skin material is a porous sheet, if the skin material is a resin sheet or the like which has no gas permeability, since the steam introduced from the vapor holes is impeded by this resin sheet and it does not reach the expanded particles, the expanded particles are not sufficiently heated. This gives rise to poor melt bonding, and the mechanical action of the obtained molded article is inferior to the case where the skin material is bonded to the molded foam using adhesive.

Accordingly, the present inventors, in consideration of said prior art, carried out extensive studies in order to obtain a polypropylene resin cellular molded article having a skin, wherein even though the skin has no gas permeability, it is possible to unite the skin material with a molded foam simultaneously with the production of the molded foam from pre-expanded particles, and moreover, wherein the melt bonding in the molded foam is not inferior. As a result, without thorough heating of one side of the dies, using pre-expanded particles of a polypropylene resin, and moreover, when performing thermal expansion of the pre-expanded particles under special conditions, even in the case where the thickness of the foam layer is large, it was discovered how to obtain a cellular molded article having a skin in which there is no occurrence of inferior melt bonding or the like, and the present invention was realized.

DISCLOSURE OF THE INVENTION

An essential feature residing in the cellular molded article of a polypropylene resin having a skin of the present invention is that a skin material and a polypropylene resin molded foam are laminated.

In the cellular molded article of a polypropylene resin having a skin, said skin material and said polypropylene resin molded foam are laminated by means of adhesive.

Furthermore, in the cellular molded article of a polypropylene resin having a skin, the expansion ratio of said polypropylene resin molded foam is from 5 to 30.

Furthermore, in the cellular molded article of a polypropylene resin having a skin, said skin material is selected from a polyolefin resin sheet such as a polypropylene resin sheet, a vinyl chloride resin sheet, a sheet of another resin, a fiber-based sheet, a resin-impregnated fiber-based sheet, a laminated sheet of one sheet chosen from these said sheets with a polyolefin resin molded foam sheet, or a laminated sheet of one sheet chosen from these said sheets with a polypropylene resin extruded foam sheet.

Moreover, in the cellular molded article of a polypropylene resin having a skin, said extruded foam sheet of a polypropylene resin has an expansion ratio of from 10 to 30.

Moreover, in the cellular molded article of a polypropylene resin having a skin, the expansion ratio of said polyolefin resin molded foam sheet is from 20 to 50.

Moreover, in the cellular molded article of a polypropylene resin having a skin, the difference between the expansion ratio of said polyolefin resin molded foam sheet and the expansion ratio of said polypropylene resin molded foam is not less than 5.

Moreover, the cellular molded article of a polypropylene resin having a skin possesses a shape-preserving material.

Furthermore, in the cellular molded article of a polypropylene resin having a skin, said shape-preserving material is bonded to the surface of the polypropylene resin molded foam.

Moreover, in the cellular molded article of a polypropylene resin having a skin, said shape-preserving material is embedded in the polypropylene resin molded foam.

Moreover, in the cellular molded article of a polypropylene resin having a skin, said shape-preserving material possesses mounting parts.

Moreover, in the cellular molded article of a polypropylene resin having a skin, said shape-preserving material comprises a polypropylene resin.

Furthermore, the cellular molded article of a polypropylene resin having a skin possesses an insert material.

The essential features of the production method of a cellular molded article of a polypropylene resin having a skin of the present invention are that after a skin material is set up in the interior of a die A, and the die A is clamped with a die B to form a mold, pre-expanded particles of a polypropylene resin are then filled in the mold, steam is supplied through vapor holes in the die B, and the pre-expanded particles are pre-heated at a temperature lower than the temperature at which the pre-expanded particles are melt bonded with each other, then "murashi" (holding in steam) of the pre-expanded particles is carried out, and next the main heating of the pre-expanded particles is performed through the die B at a temperature not less than the temperature at which the pre-expanded particles are melt bonded together.

Furthermore, in the production method of the present invention, during the main heating through the die B of the pre-expanded particles inside said mold, the die A is heated up.

Moreover, in the production method of the present invention, after the pre-heating of said pre-expanded particles, "murashi" is carried out, after which the drain is removed, and next the main heating is carried out.

Furthermore, in the production method of the present invention, a skin material which has been molded in advance is used as said skin material.

Moreover, in the production method of the present invention, after molding the skin material in the die A of said mold, the mold is charged with pre-expanded particles of a polypropylene resin.

Moreover, in the production method of the present invention, said skin material is selected from a polyolefin resin sheet such as a polypropylene resin sheet, a vinyl chloride resin sheet, a sheet of another resin, a fiber-based sheet, a resin-impregnated fiber-based sheet, a laminated sheet of one sheet chosen from these said sheets with a plyolefin resin molded foam sheet, or a laminated sheet of one sheet chosen from these said sheets with a polypropylene resin extruded foam sheet.

Furthermore, in the production method of the present invention, after setting up a shape-preserving material in said die B, the die B and the die A are clamped together.

Moreover, in the production method of the present invention, after setting up an insert material in said die B, the die B and the die A are clamped together.

Furthermore, in the production method of the present invention, either a shape-preserving material or an insert material, or both, are provided on the face of the molded foam obtained by opening said mold.

In the cellular molded article of a polypropylene resin having a skin of the present invention, by using a molded foam of a polypropylene resin formed on the back of a skin fabricated from a skin material such as a polypropylene resin, a softer feeling of touch is given when pressed compared to the conventional resin core materials, which results in an automobile interior trim material having a feeling of depth and a high-grade touch. In particular, in the case when the skin material is provided with an extruded foam sheet of a polypropylene resin, a remarkably soft and supple feel is obtained. Furthermore, since a shock-absorbing layer in the form of a molded foam of a polypropylene resin is provided, the polypropylene resin cellular molded article having a skin of the present invention has an excellent cushioning property, and in particular, in the case when an extruded foam sheet of a polypropylene resin is provided, a more excellent cushioning property is given.

Moreover, the cellular molded article of a polypropylene resin having a skin of the present invention has superior characteristics in that, since each of the base materials forming it is made of a polypropylene resin or the like, recycling is easy, and moreover, when it is burned, little noxious gas harmful to the human body is generated, though it is generally said that a foamed polyurethane generates harmful gas when burned.

The production method of a cellular molded article of a polypropylene resin having a skin of the present invention, is able to offer a cellular molded article resulting from an entirely new method of heating up one face of the mold, which nullifies the conventional common knowledge that it is necessary to heat up the pre-expanded particles in the mold using steam or the like from both faces in order that the pre-expanded particles are not poorly melt bonded with each other.

Furthermore, according to the production method of a cellular molded article of a polypropylene resin having a skin of the present invention, the reason why it is possible to produce a cellular molded article having a skin without poor melt bonding of the particles with each other is not certain, but it can be inferred that, unlike the conventional simple steam heating method, since a "murashi" (holding in steam) process after pre-heating under specific conditions is adopted, the temperature difference between the pre-expanded particles at the side of the die where the steam is introduced and those at the skin material side becomes small, so that the melt bonding by the main heating is improved.

BRIEF DESCRIPTION OF THE DRAWINGS

Both FIGS. 5, 6, 7, 8, 9, 10, 11, 21 and 13 are schematic cross-sectional drawings each of which shows a different embodiment of the cellular molded article of a polypropylene resin having a skin of the present invention.

BEST MODE FOR CARRYING OUT THE INVENTION

Embodiments of the cellular molded article of a polypropylene resin having a skin and the production method therefor of the present invention are explained below, based on the drawings.

Figure 1:
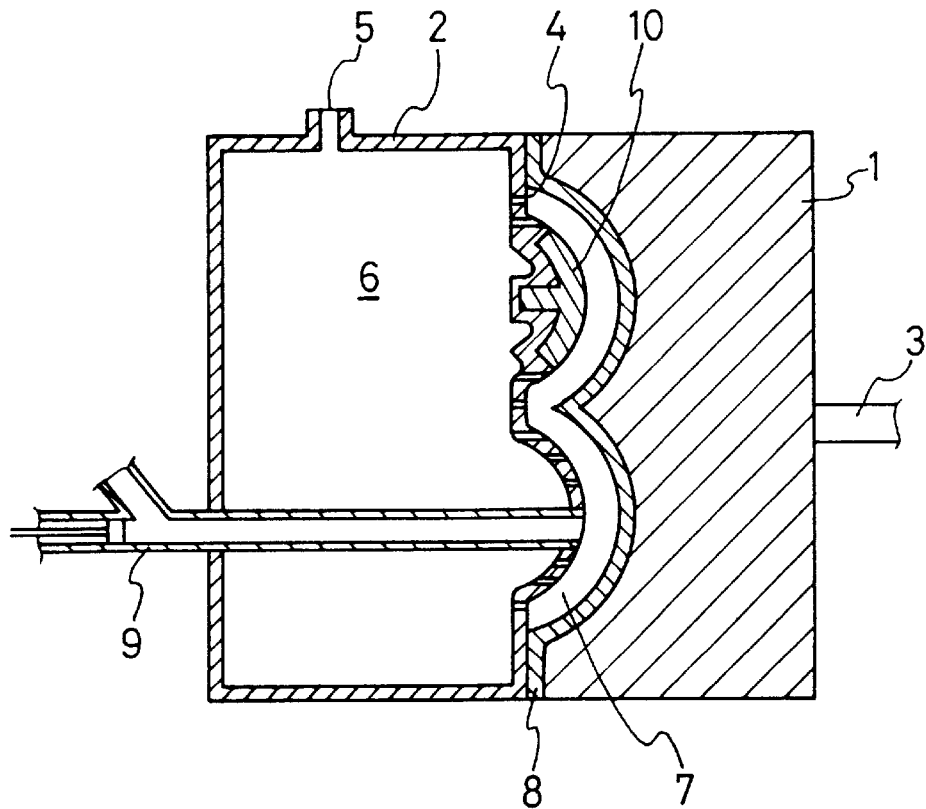
FIG. 1 is a schematic explanatory drawing showing an operational mode of a mold which is used in the production method of the present invention.

FIG. 1 is a schematic explanatory drawing of an operational mode of a mold which is used in the production method of the present invention. In FIG. 1, the die is formed by clamping a die A 1 to a die B 2. Here, in FIG. 1, the die A 1 does not have vapor holes, but in the present invention, vapor holes may be provided without causing any particular problems. The die A 1 is constructed with, for example, a connected cylinder 3 or the like, for moving the die A 1, by which the die A 1 and the die B 2 can be clamped together and opened. In the interior surface of the die B 2, a plurality of vapor holes 4 is provided, so that the steam introduced through the vapor inlet port 5 is introduced into the molding chamber 7 by passing through the vapor holes 4 via the interior 6 of the die B 2. Furthermore, the interior of the die B 2 is constructed so that a feeder 9 is provided, and using this feeder 9, raw materials of pre-expanded particles of a polypropylene resin are introduced into the molding chamber 7.

In the production method of a cellular molded article of a polypropylene resin having a skin of the present invention, heating of the pre-expanded particles is not carried out using steam through the die A 1, and hence the die A 1 is not equipped with vapor inlet ports or the like. A skin material 8 is first set up on the interior surface of the die A 1. In the present invention, a skin material having no substantial gas permeability is used; however, even if this material is permeable to gas, there is no problem.

As said skin material 8, not only a single resin sheet, but also a laminated sheet, of a resin sheet and a polyolefine resin extruded foam sheet or the like, and so forth are exemplified. Specific examples of the polyolefine resin are polypropylene, polyethylene, ethylene-propylene copolymer, chlorinated polypropylene, chlorinated polyethylene, ethylene-propylene-butene terpolymer, mixture theseof, and so forth; however, the scope of the present invention is not limited only to these illustrations.

Specific examples of said resin sheet are a vinyl chloride resin sheet, a resin sheet of a polyolefine such as a polypropylene resin, and so forth; however, the scope of the present invention is not limited only to these resin sheets. In addition, this resin sheet, because of using it as the skin of the obtained cellular molded article, may be colored with a desired color, and may be embossed in order to give a high-grade feel. Moreover, in order to give a soft-looking appearance to this surface, a woven fabric, a non-woven fabric, webbing, and so forth, may be suitably fabricated, and furthermore, in order to strengthen the resin sheet, a woven fabric, a non-woven fabric, and so forth, may be suitably fabricated on the back of the resin sheet.

Furthermore, said skin material 8 may be molded in advance into a desired shape in order to be compatible with the shape of the interior surface of the die A 1, by using, for example, vacuum forming, or the like. Moreover, in the case when said skin material 8 has plasticity, it may be inserted into the mold in the form of a sheet, and after molding it into a desired shape, for example, by vacuum forming or the like, the mold may be charged with pre-expanded particles and molding carried out.

Moreover, in order to improve the adhesiveness of the skin material 8 to the pre-expanded particles, adhesive may be placed beforehand on the surface of the skin material 8 which will come in contact with the pre-expanded particles. Particularly in the case when the skin material 8 is different from the material of the pre-expanded particles, that is to say, a polypropylene resin, it is preferable to use adhesive in order to improve the adhesiveness of the skin material 8 with the molded foam. Examples of such adhesive are a resin dissolved in an organic solvent, a resin emulsion, a resin powder, and so forth. Examples of said resins are ethylene-vinyl acetate resin, polyolefine resins such as polypropylene, polyethylene, ethylene-propylene copolymer, chlorinated polypropylene, chlorinated polyetylene, ethylene-propylene-butene terpolymer, mixtures theseof and so forth; however, the scope of the present invention is not limited only to these illustrations. The amount of said adhesive used, while not especially limited, may be suitably adjusted in accordance with the adhesive type, the bonding strength aimed for, and so forth.

Furthermore, in the present invention, in the case when it is necessary for the obtained cellular molded article to have a mounting or the like, for example, for connecting with another member, an insert material 10 may be set up in advance on the molding face of the die B 2 so that the insert material 10 is united with the molded foam during the foamed-molding of the pre-expanded particles in the mold.

The shape of said insert material 10 can be adjusted in accordance with the shape, and so forth, of the mounting or the like. Examples of the material of the insert 10 are metal and paper, as well as thermoplastic resins such as polyethylene, polypropylene, ABS resin or the like and thermosetting resins such as phenol resin, formaldehyde resin or the like; however, the scope of the present invention is not limited only to these illustrations. In order to improve the adhesiveness with the pre-expanded particles, the surface of said insert material 10 may be applied in advance, for example, with said adhesive.

Next, after clamping said die A 1 and said die B 2 together, the interior of the molding chamber 7 of the mold is charged with pre-expanded particles of a polypropylene resin.

Examples of polypropylene resin which can be used for said polypropylene resin pre-expanded particles are resins having a propylene content of not less than 50 weight %, such as polypropylene homopolymer, ethylene-propylene random copolymer, ethylene-propylene block copolymer, ethylene-propylene-butene random terpolymer, propylene-vinyl chloride copolymer, propylene-butene copolymer, propylene-maleic anhydride copolymer, and so forth. These may be used independently or as a mixture of not less than two.

Said polypropylene resin is preferably in a non-crosslinked state; however, a resin crosslinked using peroxide, radiation, and so forth, may also be used. Furthermore, a mixture of the polypropylene resin with another mixable thermoplastic resin may be used as said polypropylene resin. Specific examples of other thermoplastic resins are low density polyethylene, linear low density polyethylene, polystyrene, polybutene; ionomer, and so forth. The amount of these thermoplastic resins per 100 parts (parts by weight, similarly below) of the polypropylene resin is usually preferably not more than 20 parts, and especially preferably from 5 to 10 parts.

In order to facilitate the pre-expansion, it is usually desirable to process said polypropylene resin beforehand, for instance, after extrusion, by melting and forming the desired particle shape such as cylindrical, elliptical, spherical, cubic, rectangular parallel piped-shaped, and so forth, using, a kneader, Banbury mixer, roller or the like, so that the average diameter of this particle is from 0.1 to 10 mm, and preferably from 0.7 to 5 mm.

An example of a method for manufacturing said polypropylene resin pre-expanded particles is as follows. In a pressure vessel, polypropylene resin particles are impregnated with a volatile blowing agent, stirred while being dispersed in water, heated under pressure to a prescribed expansion temperature, and then the water dispersion is released into a low pressure region; however, the scope of the present invention is not limited only to such a method.

In the case when the expansion ratio of said polypropylene resin pre-expanded particles and the polypropylene resin molded foam expanded from these pre-expanded particles is too large, there is a tendency for the amount of the shrinkage of the obtained cellular molded article to be too large, or for the obtained cellular molded article to be too soft. On the other hand, when the expansion ratio is too small, there is a tendency for the cushioning property to be lowered. Because of this, an expansion ratio of usually from 3 to 60, preferably from 5 to 50, more preferably from 8 to 45, and especially preferably from 10 to 35 is desired.

At the time of charging the molding chamber 7 with said polypropylene resin pre-expanded particles through the feeder 9, the pre-expanded particles may be pressurized in advance by using a pressurizing gas, so that the gas is thoroughly penetrated into the pre-expanded particles and they may be filled into the molding chamber 7 in the condition of having inner pressure bestowed. Alternatively, the pre-expanded particles may be filled in the molding chamber 7 in a compressed state by using a pressurizing gas. Furthermore, the pre-expanded particles may be filled in the molding chamber 7 as they are, without giving them inner pressure and without compression. However, the scope of the present invention is not limited only to these charging methods.

After filling said pre-expanded particles of a polypropylene resin in the molding chamber 7, steam is supplied through the vapor holes of the die B 2, and the pre-expanded particles are pre-heated at a temperature lower than the temperature at which the pre-expanded particles are melt bonded together.

In the present invention, the pre-heating of the pre-expanded particles at a temperature lower than the temperature at which said pre-expanded particles are melt bonded together is also a characteristic feature. Thus, in the case when the pre-expanded particles are pre-heated, because the pre-heating is carried out before the main heating under conditions where there is insufficient melt bonding of the pre-expanded particles, it is possible to have melt bonding which is uniform and non-irregular by the main heating. Here, in the present invention at the time of the pre-heating, in the case when the pre-heating temperature is not less than the temperature at which said pre-expanded particles are melt bonded together, the pre-expanded particles are preferentially fully melt bonded at the side of the vapor holes, and as a result, insufficient steam penetrates to the pre-expanded particles at the skin material 8 side, so that poor melt bonding occurs. Hence, the pre-heating should be carried out at a temperature lower than the melt bonding temperature of the pre-expanded particles. Since it is not possible to unconditionally define the melt bonding temperature of the pre-expanded particles because of the different types, and so forth, of the resin used for the pre-expanded particles, it is preferable to investigate the melt bonding temperature of the pre-expanded particles beforehand, and then to establish the temperature of the steam introduced through the vapor holes 4 of the die B 2.

Here, said melt bonding temperature means the minimum temperature at which it is possible to melt bond pre-expanded particles with each other to maintain the shape of the cellular molded article when the pie-expanded particles are filled in a die of depth about 50 mm, and steam of a prescribed temperature (prescribed pressure) is introduced into the die for from 10 to 20 seconds.

Furthermore, when the temperature of the steam is too low during the pre-heating, because there is a tendency that the pre-heating effect is insufficiently manifested, it is desirable that the steam temperature is from not more than the melt bonding temperature of the pre-expanded particles to not less than 35° C. below the melt bonding temperature, preferably from not more than 3° C. below the melt bonding temperature to not less than 30° C. below the melt bonding temperature, and more preferably from not more than 5° C. below the melt bonding temperature to not less than 25° C. below the melt bonding temperature. Moreover, the steam pressure when carrying out the pre-heating should be suitably regulated so that the steam temperature is within the above range.

Another characteristic feature of the present invention is to perform "murashi" (holding in steam) of the pre-expanded particles, after supplying steam through the vapor holes 4 of the die B 2 and performing the pre-heating. The "murashi" of the pre-expanded particles may be carried out under the same conditions of continuous introduction of steam at which the pre-heating was performed. Alternatively, the steam supply may be suspended, and moreover, the "murashi" (holding in steam) may be carried out with the drain valve open. Thus, in the case when "murashi" of the pre-expanded particles is performed, an advantage is that it is possible to effectively utilize the latent heat of the steam introduced among the pre-expanded particles in the molding chamber 7, in particular, in the case of fabricating a molded foam having a large thickness, an advantage is that it is possible to uniformly heat the pre-expanded particles. Here, in the case when "murashi" of the pre-expanded particles is thus performed, since the thickness of the layer of pre-expanded particles in the molding chamber 7, the size, shape and expansion ratio, and so forth, of the pre-expanded particles used, and the steam heat transfer rate vary, it is not possible to unconditionally define the time required for this "murashi"; however, for a normal pre-expanded particle layer thickness of about 50 mm, it is desirable that the time is not less than about 3 seconds, preferably not less than about 5 seconds, and more preferably not less than about 10 seconds.

After performing said "murashi" (holding in steam), drain (moisture) exists between the pre-expanded particles, and since poor melt bonding of the pre-expanded particles with each other occurs if the main heating is carried out in this condition, it is preferable that the drain arising from the "murashi" (holding in steam) is removed. Examples of methods for removing this drain include a method of vacuum pumping the molding chamber 7 by utilizing the vapor holes 4 provided in the die B 2, and a method in which the vapor holes 4 are ventilated with dried air of a high temperature at which there is no substantial fusing of the pre-expanded particles, an opening is set up between the die A 1 and the die B 2, and the drain is removed through this opening; however, the scope of the present invention is not limited only to these methods.

Next, the main heating up of the pre-expanded particles is carried out at a temperature not less than the temperature at which said pre-expanded particles melt bond together. This main heating is carried out by heating the pre-expanded particles by means of steam through the vapor holes 4, via the vapor inlet port 5 of the die B 2.

After the main heating of said pre-expanded particles, it is preferable that the conditions are maintained in order to transfer enough heat to the pre-expanded particles using the steam. Because the pre-expanded particle layer thickness, and so forth, used varies, the time required to maintain the condition cannot be unconditionally defined; however, as an example, per 100 mm approximately of the pre-expanded particle layer thickness, the desired time is not less than about 3 seconds and preferably not less than about 5 seconds. However, since in the case when this time is too long, shrinkage occurs in the obtained cellular molded article, it is preferable to suitably regulate the time within the range where shrinkage does not develop during molding.

Figure 2:
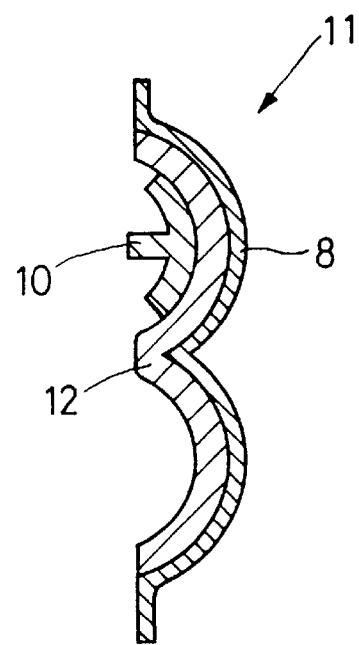
FIG. 2 is a schematic cross-sectional drawing showing an embodiment of the cellular molded article of a polypropylene resin having a skin which is produced using the production method shown in FIG. 1.

Then, by opening the mold, a cellular molded article 11 is obtained, as shown in FIG. 2. In addition, in the present invention the obtained cellular molded article 11 may be cooled in advance before opening the mold. Furthermore, it is preferable that the obtained cellular molded article 11, after separating from the mold, is aged and dried, for example, at 50 to 80° C. under normal atmospheric pressure for 3 to 24 hours.

According to the production method of a polypropylene resin cellular molded article having a skin of the present invention, it is possible to until the molded foam 12 with the skin material 8, simultaneously to producing the molded foam 12 from the pre-expanded particles, even if the skin material 8 is not permeable to air, and moreover, it is possible to produce a cellular molded article in which there is no occurrence of poor melt bonding in the molded foam 12.

In the production method of the present invention, furthermore, since even in the case when a thick molded foam and a skin material are unitary molded in a mold using a skin material which has no gas permeability and which does not allow the application of heating of both faces through vapor holes in both faces of the dies, there is no occurrence of poor melt bonding at the face where the molded foam and the skin material meet, and excellent cellular molded articles can be provided, in particular, it is also possible to suitably produce a cellular molded article having a skin made of a skin material which has no gas permeability and a molded foam having a comparatively large thickness, for example, an extremely thick molded foam of a thickness of about 200 mm.

The production method of a cellular molded article of a polypropylene resin having a skin of the present invention will be explained in more detail by means of the following examples; however, the scope of this invention is not limited only to these examples.

EXAMPLE 1

A vinyl chloride resin sheet (thickness 1.5 mm), having a woven fabric pasted to one surface and a sprayed bonded ethylene-vinyl acetate resin of weighting capacity 50 g/m$^2$ on the vinyl chloride resin sheet face, was used as a skin material, and the woven fabric-pasted face was stuck by contact onto a flat die A having no vapor holes.

Furthermore, on a part of the interior surface of a die B (length 300 mm, width 300 mm, depth 50 mm) having vapor holes was fixed an insert material of a steel hook (surface coating: ethylene vinyl acetate resin) for fixing a locking screw.

EPERAN PP (Trade Name, made by Kanegafuchi Chemical Industry Co., Ltd., expansion ratio 45) was used for the polypropylene pre-expanded particles, beforehand inserted into a pressure vessel and imparted with an inner pressure of 2 kg/cm$^2$ G using air pressure, and these were then filled in the molding chamber of a mold constructed by clamping the die A with the die B via a feeder provided in the die B.

Next, steam (steam pressure 0.5 kg/cm$^2$ G, temperature 109 to 113° C.) was introduced into the molding chamber through the vapor holes of the die B and pre-heating was carried out, and after "murashi" (holding in steam) of the pre-expanded particles was performed for 10 seconds, the drain and the steam were removed by vacuum pumping to a pressure in the molding chamber of not more than 500 mm Hg.

Following this, steam (steam pressure 2.4 to 2.8 kg/cm$^2$ G, temperature 137 to 142° C.) was introduced into the molding chamber through the vapor holes of the die B, and after maintaining this condition for 25 seconds, and cooling, the die A and the die B were opened, and a polypropylene resin cellular molded article having a skin was obtained.

The physical properties of melt bonding ratio and skin adhesiveness to the obtained cellular molded article were investigated according to the following methods. The results are shown in Table 1.

(1) Melt Bonding Ratio

Using a knife, a thin cut was made in the surface of the obtained cellular molded article, and then the article was ruptured by bending over double, and the broken face was examined. The proportion of the broken area of the exparded particles was expressed as expressed as a percentage, and evaluated according to the appraisal criteria shown below.

(Appraisal Criteria)

A: Melt bonding ratio is not less than 60%

B: Melt bonding ratio is 40 to 59%

C: Melt bonding ratio is 20 to 39%

D: Melt bonding ratio is not more than 19%

(2) Adhesiveness to Skin

The skin and foamed body of the obtained cellular molded article were peeled apart, the condition of the interface was examined, and evaluation was made according to the following appraisal criteria.

(Appraisal Criteria)

A: Only rupture of the material in the foam layer is observed.

B: Rupture of the foam layer material and peeling at the inerface of the foam layer with the skin are both observed.

C: Peeling at the interface of the foam layer with the skin is observed.

D: No adhesion between the skin and the foam layer.

TABLE 1

| | Properties of cellular molded articles | |
|---|---|---|
| | Melt bonding ratio | Adhesiveness to skin |
| Example 1 | A | A |
| Example 2 | A | A |
| Example 3 | A | A |
| Example 4 | A | A |
| Example 5 | A | A |
| Comparative Ex. 1 | B-C | C |
| Comparative Ex. 2 | B-C | C |
| Comparative Ex. 3 | D | D |

EXAMPLE 2

A cellular molded article was obtained similarly to Example 1, except that the skin material used in Example 1 was replaced by a laminated sheet of a vinyl chloride resin sheet (thickness 0.5 mm) and a polypropylene resin extruded foam sheet (thickness 2.5 mm), the vinyl chloride resin sheet face of the laminated sheet was stuck by contact to the flat die A having no vapor holes, and the die B had no insert material nor any hole for mounting an insert material.

The physical properties of the obtained cellular molded article were investigated similarly to Example 1. The results are shown in Table 1.

EXAMPLE 3

A laminated sheet of a polyolefin resin sheet (thickness 0.75 mm) and a polypropylene resin extruded foam sheet (thickness 3.5 mm) was used as a skin material, and the resin sheet face of the laminated sheet was stuck by contact to a die A. Furthermore, on a part of the interior surface of a die B (length 300 mm, width 300 mm, depth 60 mm) having vapor holes, a polyolefin resin hook (surface coating: chlorinated polypropylene) for fixing a locking screw was set up as an insert material.

As polypropylene resin pre-expanded particle, EPERAN PP (Trade Name, made by Kanegafuchi Chemical Industry Co., Ltd., expansion ratio 30) was filled in the molding chamber of the mold formed by clamping the die B and the die A together, via a feeder provided in the die B.

Then, pre-heating was carried out by introducing steam (steam pressure 0.6 kg/cm$^2$ G, temperature 112 to 115° C.) into the molding chamber of the mold through the vapor holes of the die B and then the introduction of the steam was stopped and "murashi" (holding in steam) of the pre-expanded particles was carried out for 10 seconds, after which the drain and the steam were removed by vacuum pumping to a molding chamber inner pressure of not more than 500 mm Hg. After this, steam (steam pressure 3.2 kg/cm$^2$ G, temperature 144 to 146° C.) was introduced into the mold through the vapor holes of the die B, and after maintaining this condition for 20 seconds, and cooling, the die A and the die B were opened, and a polypropylene resin cellular molded article having a skin was obtained.

The physical properties of the obtained cellular molded article were investigated similarly to Example 1. The results are shown in Table 1.

EXAMPLE 4

A laminated sheet of a polyolefin resin sheet (thickness 0.75 mm) and a polypropylene resin extruded foam sheet (thickness 3.5 mm) was used as a skin material, and the resin sheet face of the laminated sheet was stuck by contact to a flat die A having no vapor holes. Furthermore, a 300 mm long by 300 mm wide by 150 mm deep die was used as the die B having vapor holes.

As polypropylene resin pre-expanded particle, EPERAN PP (Trade Name, made by Kanegafuchi Chemical Industry Co., Ltd., expansion ratio 15) was filled in the molding chamber formed by clamping the die B and the die A together, via a feeder provided in the die B.

Then, pre-heating was carried out by introducing steam (steam pressure 1.0 kg/cm$^2$ G, temperature 117 to 123° C.) into the molding chamber through the vapor holes of the die B, and then the introduction of the steam was stopped and "murashi" (holding in steam) of the pre-expanded particles was carried out for 15 seconds, after which the drain and the steam were removed by vacuum pumping to a molding chamber inner pressure of not more than 260 mm Hg. After this, steam (steam pressure 3.5 to 3.8 kg/cm$^2$ G, temperature 147 to 150° C.) was introduced into the molding chamber through the vapor holes of the die B, and after maintaining this for 30 seconds, and cooling, the die A and the die B were opened, and a polypropylene resin cellular molded article having a skin was obtained.

The physical properties of the obtained cellular molded article were investigated similarly to Example 1. The results are shown in Table 1.

EXAMPLE 5

A laminated sheet of a polyolefin resin sheet (thickness 0.75 mm) and a polypropylene resin extruded foam sheet (thickness 3.5 mm) was used as a skin material, and the resin sheet face of the laminated sheet was stuck by contact to a flat die A having no vapor holes. Furthermore, a 300 mm long by 300 mm wide by 200 mm deep die was used as the die B having vapor holes.

As polypropylene resin pre-expanded particles, EPERAN PP (Trade Mark, made by Kanegafuchi Chemical Industry Co., Ltd., expansion ratio 15) was filled in the molding chamber of the mold formed by clamping the die B and the die A together, via a feeder provided in the die B.

Next, pre-heating was carried out by introducing steam (steam pressure 0.6 kg/cm$^2$ G, temperature 112 to 115° C.) into the molding chamber through the vapor holes of the die B, and then the introduction of the steam was stopped and "murashi" (holding in steam) of the pre-expanded particles was carried out for 20 seconds, after which the drain and the steam were removed by vacuum pumping to a molding chamber inner pressure of not more than 260 mm Hg. After this, steam (steam pressure 3.5 to 3.8 g/cm$^2$ G, temperature 147 to 150° C.) was introduced into the molding chamber through the vapor holes of the die B, and after maintaining this for 25 seconds, and cooling, the die A and the die B were opened, and a polypropylene resin cellular molded article having a skin was obtained.

The physical properties of the obtained cellular molded article were investigated similarly to Example 1. The results are shown in Table 1.

COMPARATIVE EXAMPLE 1

A polypropylene resin cellular molded article was obtained in a similar manner to Example 1, except that after the pre-heating, removal of the drain and the steam by suction was carried out without performing "murashi" (holding in steam).

The physical properties of the obtained cellular molded article were investigated similarly to Example 1. The results are shown in Table 1.

COMPARATIVE EXAMPLE 2

A polypropylene resin cellular molded article was obtained in a similar manner to Example 3, except that a die which did not have an insert material nor a mounting hole for an insert material was used as the die B, and after the pre-heating, "murashi" was not carried out.

The physical properties of the obtained cellular molded article were investigated similarly to Example 1. The results are shown in Table 1.

COMPARATIVE EXAMPLE 3

A polypropylene resin cellular molded article was obtained in a similar manner to Comparative Example 2, except that the pre-heating was not carried out.

The physical properties of the obtained cellular molded article were investigated similarly to Example 1. The results are shown in Table 1.

From the results shown in Table 1, it can be clearly seen that when the production methods of a polypropylene resin cellular molded article having a skin in Examples 1 to 5 are used, even though the skin has no gas permeability, it is possible to produce a cellular molded article from pre-expanded particles and simultaneously unite the skin material and the molded foam with good adhesiveness in a short time, and furthermore that the obtained cellular molded article has excellent melt bonding together of the pre-expanded particles.

Now, in the method for producing a cellular molded article of a polypropylene resin having a skin of the present invention, not only the die B, but also the die A may be heated approximately simultaneously when carrying out the main heating.

Figure 3:
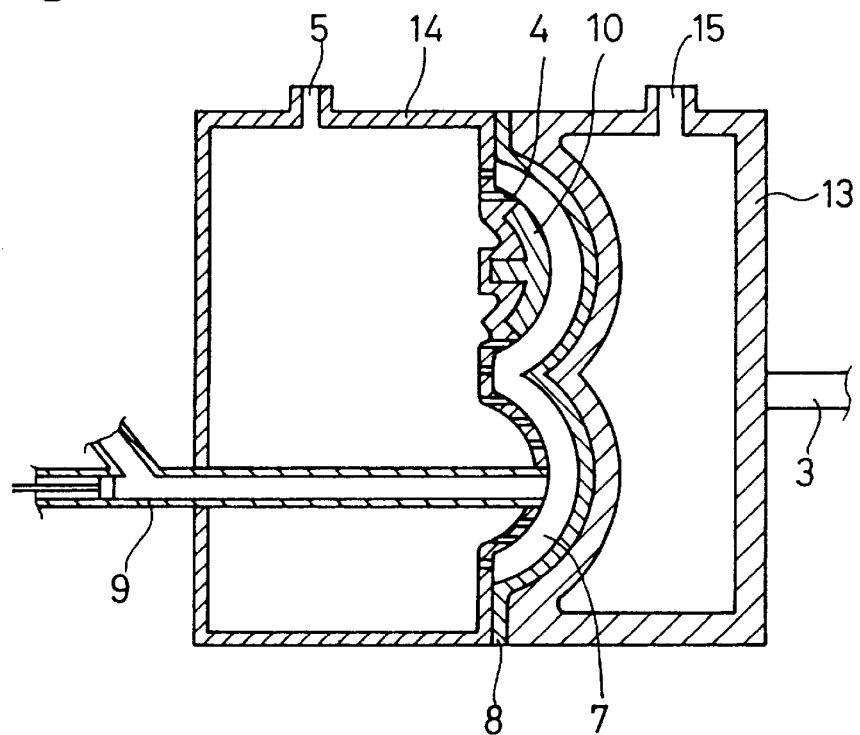
FIGS. 3 and 4 are schematic explanatory drawings showing other operational modes of molds used in the production method of the present invention.

For example, as shown in FIG. 3, using a mold formed from a die A 13 and a die B 14, firstly in a similar manner to the above mentioned examples, after equipping the interior surface of the die A 13 with a skin material 8, and equipping the molding surface of the die B 14 with an insert material 10 as occasion demands, the die A 13 and the die B 14 are clamped together, after which the molding chamber 7 of the mold is charged with polypropylene resin pre-expanded particles via a feeder 9. Then in a similar manner to the above-mentioned examples, after performing the pre-heating, "murashi" is applied, and following this, the main heating is carried out.

This main heating can be carried out by heating the pre-expanded particles by means of steam through the vapor holes 4 via the steam inlet port 5 of the die B 14, and simultaneously introducing steam from the steam inlet port 15 of the die A 13 to steam-heat the die A 13. Here, as the method for heating up the die A 13, methods other than steam heating can be employed, for example, by using a heater or the like, for heating. After the main heating, the mold is opened using a normal method, and the cellular molded article is obtained.

According to the production method of the present invention, in addition to the same effects as the above-mentioned examples, it is possible to produce a suitable polypropylene resin cellular molded article having a skin made of a molded foam of larger thickness (about 300 mm) and a skin material which has no permeability. Furthermore, it is possible to mold the surface shape of the skin of the obtained cellular molded article so that it is compatible with the inner shape of the molding surface of the die A 13.

This kind of embodiment will now be explained using the following specific examples.

EXAMPLE 6

In a similar manner to the above-mentioned Example 1, the interior of the mold was equipped with a skin material, and after clamping, was charged with EPERAN PP using a similar technique, pre-heating and "murashi" (holding in steam) were performed, and further, the drain and the steam were removed by suction. Next, steam (steam pressure 2.4 to 2.8 kg/cm$^2$ G, temperature 137 to 142° C.) was introduced into the molding chamber through the vapor holes of the die B, and simultaneously steam (steam pressure 2.4 to 2.8 kg/cm$^2$ G, temperature 137 to 142° C.) was introduced into the inside of the die A from the vapor inlet port of the die A, and after maintaining this for 25 seconds, and cooling, the die A and the die B were then opened and a polypropylene resin cellular molded article having a skin was obtained.

The physical properties of the obtained cellular molded article were investigated similarly to Example 1. The results are shown in Table 2.

TABLE 2

| | Properties of cellular molded articles | |
|---|---|---|
| | Melt bonding ratio | Adhesiveness to skin |
| Example 6 | A | A |
| Example 7 | A | A |
| Example 8 | A | A |
| Example 9 | A | A |
| Example 10 | A | A |
| Comparative Ex. 4 | B-C | C |
| Comparative Ex. 5 | B-C | C |
| Comparative Ex. 6 | D | D |

EXAMPLE 7

A cellular molded article was obtained similarly to Example 6, except that the skin material used in Example 6 was replaced by a laminated sheet of a vinyl chloride resin sheet (thickness 0.5 mm) and a polypropylene resin extruded foam sheet (thickness 2.5 mm), the vinyl chloride resin sheet face of the laminated sheet was stuck by contact to the flat die A having no vapor holes, and a die which did not have an insert material nor any hole for mounting an insert material was used as the die B.

The physical properties of the obtained cellular molded article were investigated similarly to Example 6. The results are shown in Table 2.

EXAMPLE 8

A laminated sheet of a polypropylene resin sheet (thickness 0.75 mm) and a polypropylene resin extruded foam sheet (thickness 3.5 mm) was used as a skin material, and the resin sheet face of the laminated sheet was stuck by contact to a die A. Futhermore, on a part of the interior surface of a die B (length 300 mm, width 300 mm, depth 60 mm) having vapor holes, a polyolefine resin hook (surface coating: chlorinated polypropylene) for fixing a locking screw was set up as an insert material. As polypropylene resin pre-expanded particles, EPERAN PP (Trade Name, made by Kanegafuchi Chemical Industry Co., Ltd., expansion ratio 30) was filled in the molding chamber of the mold formed by clamping the die B and the die A together, via a feeder provided in the die B.

Then, pre-heating was carried out by introducing steam (steam pressure 0.5 kg/cm² G, temperature 109 to 113° C.) into the molding chamber of the mold through the vapor holes of the die B, and then the introduction of the steam was stopped and "murashi" of the pre-expanded particles was carried out for 10 seconds, after which the drain and the steam were removed by vacuum pumping to a molding chamber inner pressure of not more than 260 mm Hg. After this, steam (steam pressure 3.2 kg/cm² G, temperature 144 to 146° C.) was introduced into the interior of the mold through the vapor holes of the die B, and simultaneously steam (steam pressure 2.4 to 2.8 kg/cm² G, temperature 137 to 142° C.) was introduced into the interior of the die A from the vapor inlet port of the die A, and after maintaining this for 20 seconds, and cooling, the die A and the die B were opened, and a polypropylene resin cellular molded article having a skin was obtained.

The physical properties of the obtained cellular molded article were investigated similarly to Example 6. The results are shown in Table 2.

EXAMPLE 9

A laminated sheet of a polypropylene resin sheet (thickness 0.75 mm) and a polypropylene resin extruded foam sheet (thickness 3.5 mm) was used as a skin material, and the resin sheet face of the laminated sheet was stuck by contact to a flat die A. Furthermore, a 300 mm long by 300 mm wide by 200 mm deep die was used as the die B having vapor holes. As polypropylene resin pre-expanded particles, EPERAN PP (Trade Name, made by Kanegafuchi Chemical Industry Co., Ltd., expansion ratio 15) was filled in the molding chamber formed by clamping the die B and the die A together, via a feeder provided in the die B.

Then, pre-heating was carried out by introducing steam (steam pressure 0.6 kg/cm² G, temperature 112 to 115° C.) into the molding chamber through the vapor holes of the die B, and then the introduction of the steam was stopped "murashi" (holding in steam) of the pre-expanded particles was carried out for 15 seconds, after which the drain and the steam were removed by vacuum pumping to a molding chamber inner pressure of not more than 260 mm Hg.

After this, steam (steam pressure 3.5 to 3.8 kg/cm² G, temperature 147 to 150° C.) was introduced into the molding chamber through the vapor holes of the die B, and simultaneously steam (steam pressure 3.5 to 3.8 kg/cm² G, temperature 147 to 150° C.) was introduced into the inside of the die A from the vapor inlet port of the die A, and after maintaining this for 30 seconds, and cooling, the die A and the die B were opened, and a polypropylene resin cellular molded article having a skin was obtained.

The physical properties of the obtained cellular molded article were investigated similarly to Example 6. The results are shown in table 2.

EXAMPLE 10

A laminated sheet of a polyolefine resin sheet (thickness 0.75 mm) and a polypropylene resin extruded foam sheet (thickness 3.5 mm) was used as a skin material, and the resin sheet face of the laminated sheet was stuck by contact to a flat die A having no vapor holes. Furthermore, a 300 mm long by 300 mm wide by 250 mm deep die was used as the die B having vapor holes. As polypropylene resin pre-expanded particles, EPERAN PP (Trade Name, made by Kanegafuchi Chemical Industry Co., Ltd., expansion ratio 15) was filled in the molding chamber of the mold formed by clamping the die A and the die B together, via a feeder provided in the die B.

Next, pre-heating was carried out by introducing steam (steam pressure 1.0 kg/cm² G, temperature 117 to 123° C.) into the molding chamber through the vapor holes of the die B, and then the introduction of the steam was stopped and "murashi" (holding in steam) of the pre-expanded particles was carried out for 20 seconds, after which the drain and the steam were removed by vacuum pumping to a molding chamber inner pressure of not more than 260 mm Hg.

After this, steam (steam pressure 3.5 to 3.8 kg/cm² G, temperature 147 to 150° C.) was introduced into the molding chamber through the vapor holes of the die B, and simultaneously steam (steam pressure 3.5 to 3.8 kg/cm² G, temperature 147 to 150° C.) was introduced into the inside of the die A from the vapor inlet port of the die A, and after maintaining this for 25 seconds, and cooling, the die A and the die B were opened, and a polypropylene resin cellular molded article having a skin was obtained.

The physical properties of the obtained cellular molded article were investigated similarly to Example 6. The results are shown in Table 2.

COMPARATIVE EXAMPLE 4

A polypropylene resin cellular molded article was obtained in a similar manner to Example 6, except that after the pre-heating, removal of the drain and the steam by suction was carried out without performing "murashi" (holding in steam).

The physical properties of the obtained cellular molded article were investigated similarly to Example 6. The results are shown in Table 2.

COMPARATIVE EXAMPLE 5

A polypropylene resin cellular molded article was obtained in a similar manner to Example 8, except that a die which did not have an insert material nor a mounting hole for an insert material was used as the die B, and after the pre-heating, "murashi" (holding in steam) was not carried out.

The physical properties of the obtained cellular molded article were investigated similarly to Example 6. The results are shown in Table 2.

COMPARATIVE EXAMPLE 6

A polypropylene resin cellular molded article was obtained in a similar manner to Comparative Example 5, except that the pre-heating was not carried out.

The physical properties of the obtained cellular molded article were investigated similarly to Example 6. The results are shown in Table 2.

Examples of the polypropylene resin cellular molded article having a skin of the present invention and the production method there for have been explained in detail above; however, the scope of the present invention is not limited to the above-mentioned examples.

For example, the skin material is not limited to the above-mentioned polyolefine resin sheets such as a polypropylene resin sheet, a vinyl chloride resin sheet or the like, or a sheet of another resin, and may be a fiber-based sheet, and a resin-impregnated fiber-based sheet, a laminated sheet of one sheet chosen from these sheets with a polyolefine molded foam sheet, or a laminated sheet of one sheet chosen from these sheets with a polypropylene resin extruded foam sheet. Here, the polyolefine resin molded foam sheet comprises a polyolefine resin fabricated in sheet form by being expanded in a mold.

Here, the fiber-based sheet forms a fibrous skin having gas permeability, for example, a woven fabric, a non-woven fabric, knitted goods, and so forth; however the present invention is not limited only to these illustrations. In the present invention, the type of fiber-based sheet used can be suitably selected in accordance with the use. As an example, in the case of obtaining an automobile interior trim material having a fluffed tone soft pile, a needle punch non-woven fabric can be used as said fiber-based sheet. Furthermore, in the case of obtaining an automobile interior trim material having a so-called back skin tone high-grade feel, a suede tone artificial leather, such as ECSAINE (Trade Name, made by Toray Industry) or the like, can be used as said fiber-based sheet.

The type of fiber used in said fiber-based sheet is not particularly limited. Examples are synthetic fibers such as polyester fiber, polyethylene fiber, polypropylene fiber, polyvinyl chloride fiber, polyvinylidene fiber, polyamide fiber and ethylene-vinyl acetate copolymer fiber; semi-synthetic fibers such as rayon fiber and acetate fiber; natural fibers such as cotton and wool, and so forth. Of these fibers, polyester fiber is preferred from the viewpoints of resistance to heat, resistance to light and resistance to wear. Furthermore, polypropylene fiber and polyethylene fiber, and in particular polypropylene fiber are preferred from the viewpoints of adhesiveness to the polypropylene resin extruded foam sheet and the ability to be recycled.

The thickness of said fiber-based sheet can be suitably adjusted in accordance with the type of fiber-based sheet and the surface condition and so forth for the purpose of using as an automobile interior trim material or the like.

Since the polypropylene resin extruded foam sheet which is laminated to said fiber-based sheet is molded by extrusion a foaming of polypropylene resin, it has no gas permeability. If this extruded foam sheet is used as an intermediate layer between the fiber-based sheet and the molded foam body, it gives a supple sense of feel to the obtained automobile interior trim material when the skin is pressed. Accordingly, the expansion ratio of the extruded foam sheet is preferably from about 10 to about 30, and especially prefesably from about 15 to about 25, because when the expansion ratio is too small there is a tendency for the obtained automobile interior trim material to have an excessively hard feel. Furthermore, in the case when the expansion ratio is too large, there is a tendency for the obtained automobile interior trim material to be too soft to the touch.

Furthermore, the thickness of the extruded foam sheet is preferably from about 1 mm to about 4 mm, and especially preferably from about 1.5 mm to about 3.5 mm, because in the case when the thickness is too small, the sense of touch of the obtained automobile interior trim material feels hard, and there is a tendency to have a small cushioning property; and further, when the thickness is too large there is a tendency that the sense of touch of the automobile interior trim material becomes too soft.

Said fiber-based sheet and said extruded foam sheet can be united by, for example, a method of uniting both by adhesive, and when the fiber-based sheet is composed of a thermosetting plastic resin fiber, in particular a polyolefin resin fiber, both can be united using a method of fusing by heating, and so forth. In addition, the scope of the present invention is not limited to using these uniting methods. Furthermore, in the present invention, it is possible to prepare in advance a writed laminate of said fiber-based sheet and said extruded foam sheet, and to unite this laminate with a molded foam.

Furthermore, the laminate of the fiber-based sheet and extruded foam sheet may be formed beforehand in a desired shape by vacuum forming or the like in order to be conformed to the shape of the interior surface of the die A. Moreover, in the case when said laminate has plasticity, it may be put into the mold in the form of a sheet, and after molding said laminate into a desired shape, for example, by vacuum forming or the like, the pre-expanded particles may be filled in the mold and molded.

Figure 4:
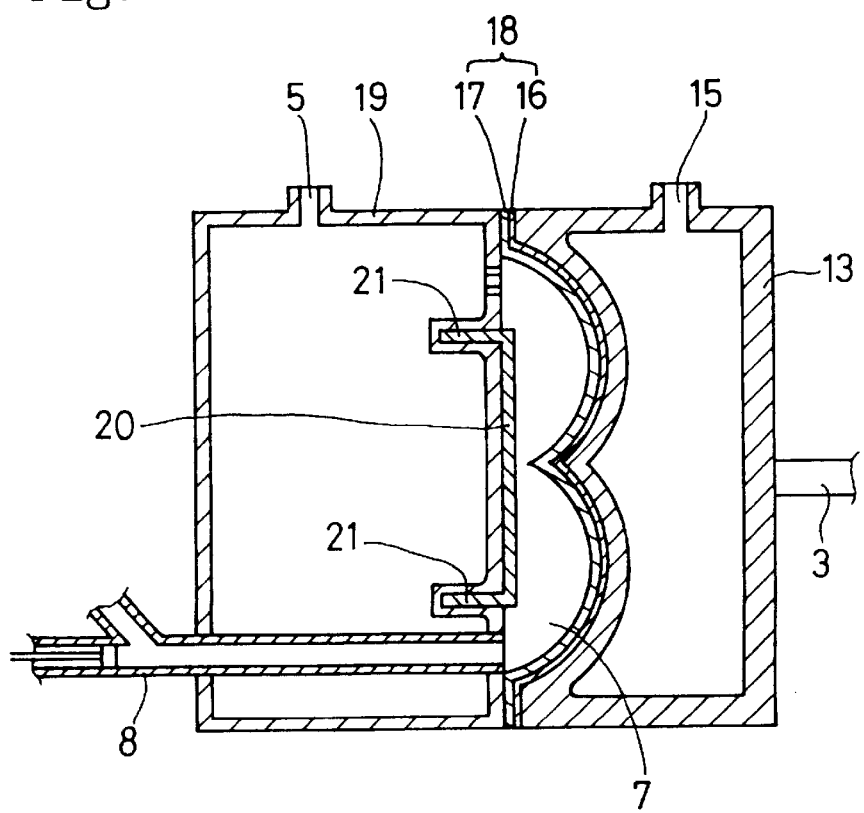

As shown in FIG. 4, after equipping the interior surface of the die A 13 with a laminate 18 of a fiber-based sheet 16 and an extruded foam sheet 17, similarly to the above-mentioned example, the die A 13 is clamped with the die B 19, and using a similar method, a polypropylene resin cellular molded article is produced. On this occasion, the molding face of the die B 19 may be equipped with a shape-preserving method 20 instead of, or together with, the above-mentioned insert member.

Immediately after removing the resin cellular molded article from the mold, shrinkage of the molded foam occurs, but the laminate 18 suppresses the shrinkage of the molded foam at the face on which it is provided, while in contrast, the shrinkage progresses at the face where the laminate 18 is not provided. As a result, the automobile interior trim material of a cellular molded article of a polypropylene resin having a skin is entirely deformed. In order to prevent this kind of deformation of the automobile interior trim material, that is to say, to bestow a deformation preventing function, a shape-preserving material 20 is set up on the automobile interior trim material face which is not provided with a laminate 18, that is to say, either by sticking the shape-preserving material 20 onto the molded foam face or by embedding the shape-preserving material 20 in the molded foam body. Here, the shape-preserving material 20 can, in addition to said deformation preventing function, bestow strengthening function, a function for mounting assembly parts, and so forth, to the automobile interior trim material.

Examples of methods for providing a shape-preserving material 20 are a method in which a shape-preserving material 20 is set up beforehand on the interior surface of the die B 19, and the shape-preserving material 20 and the molded foam are then united during molding the pre-expanded particles, a method im which a laminate of a fibrous skin and a polypropylene resin extruded foam sheet is united with the molded foam in the mold, and after removing this from the mold, a shape-preserving material is set up on the face of said molded foam; and so furth.

The shape of said shape-preserving material 20 can be adjusted according to the shape, and so forth, of the automobile interior trim material or the like. Examples of materials for the shape-preserving material are paper, metal, wire netting and wood, as well as thermoplastic resins such as polyethylene, polypropylene and ABS resin, thermosetting resins such as phenol resin and formaldehyde resin, FRP, and so forth; however, the scope of the present invention is not limited only to these illustrations. Of these materials, in consideration of recyclability of the obtained automobile interior trim material, for example, polypropylene or the like, is especially preferred.

In the former method, since at the time of uniting the shape-preserving material 20 with the molded foam during molding of the molded foam, a shape-preserving material which is softened or melted by the heating during molding cannot manifest sufficiently the deformation prevention function, it is preferred that a shape-preserving material is used which can withstand the heating during molding.

Furthermore, in the case when the shape-preserving material is stuck to the face of an automobile interior trim material which is not provided with a laminate 18, after setting up the shape-preserving material on the interior surface of the die B, the mold may be closed, then charged with pre-expanded particles, and then molding may be carried out. In this case, in order to firmly bond the molded foam to the shape-preserving material at the time of foamed-molding of the pre-expanded particles, the shape-preserving material may be bonded at the face which contacts the pre-expanded particles, beforehand, for example, with said adhesive or the like.

In the case when only said deformation prevention function is imparted to the automobile interior trim material, in order to promote weight lightening, it is preferable to use a material which is itself lightweight, such as paper, for the material for said shape-preserving material. Furthermore, in the case when a very hard material is used for the shape-preserving material, there is not only a function of preventing deformation, but also an improvement in the strength of the automobile interior trim material itself, that is to say, the strengthening function is improved.

When the shape-preserving material is embedded in the molded foam of the automobile interior trim material, for example, similarly as shown in FIG. 4, after setting up the shape-preserving material 20 inside the die B 19, the mold may be closed and charged with pre-expanded particles, and then molding can be carried out. In this case, in order to embed the shape-preserving material 20 in the molded foam, for example, a slot may be provided in a part of the die B 19 and into said slot may be inserted a mounting part 21 for connecting to, for example, another member so that during molding, the shape-preserving material 20 may be embedded in the molded foam.

Here, the shape of this mounting part 21 is not particularly limited, and furthermore, the mounting part 21 need not be set up in the case when it is not required.

In addition, in order to enhance the adhesiveness of the surface of the shape-preserving material 20 with the pre-expanded particles, for example, adhesive or the like may be applied to it beforehand, as mentioned in the above.

In the case of employing the latter method for providing said shape-preserving material 20, that is to say, the method which sets up afterwards a shape-preserving method on the face of a molded foam obtained by opening the mold, the shape-preserving material and the face of the molded form should be pasted togethar, for example using said adhesive or the like. Here, of the two methods for providing said shape-preserving material on the face of a molded foam, since generally shrinkage of the molded foam begins immediately after opening the mold, the former method is especially preferred in the present invention in order to sufficiently retard this kind of shrinkage.

The above-mentioned embodiments will now be explained more specifically.

EXAMPLE 11

A needle punch non-woven fabric made of polypropylene fibers (thickness 2 mm) and a polypropylene resin extruded foam sheet (expansion ratio 20, thickness 3 mm), were, after heating to melt their respective bonding face, superimposed on one another and the united laminate was, on its non-woven fabric face, stuck by contact to a flat die face having no vapor holes.

Furthermore, in a slot provided in the interior face of a die (length 300 mm, width 800 mm, depth 20 mm) having vapor holes, a rectangular shape-preserving material (length 250 mm, width 750 mm) made of a steel frame (diameter 1 mm, surface coating: ethylene-vinyl acetate resin) having a steel mounting hook (surface coating: ethylene-vinyl acetate resin) for fixing a locking screw was inserted and fixed.

Then, using a similar method to the above-mentioned production method of a polypropylene resin cellular molded article having a skin, firstly, as polypropylene resin pre-expanded particles, EPERAN PP (Trade Name, made by Kanegafuchi Chemical Industry Co., Ltd., expansion ratio 15), which had been beforehand put in a pressure vessel and given an inner pressure of 2 $kg/cm^2$ G, were used, and filled in a mold made from the above-mentioned dies. Following this, steam (steam pressure 0.6 $kg/cm^2$ G, temperature 112 to 115° C.) was introduced into the mold through the die having vapor holes and pre-heating was performed, and then after "murashi" (holding in steam) of the pre-expanded particles for about 10 seconds, the drain and the steam were removed by suction using a vacuum pump to give an inner pressure of not more than 500 mm Hg in the mold.

Following this, steam (steam pressure 3.5 $kg/cm^2$ G, temperature 146 to 148° C.) was introduced into the mold through the die having vapor holes, and after maintaining this for 25 seconds, and cooling, the mold was opened and an automobile interior trim material was obtained.

The physical properties of melt bonding ratio, adhesiveness to the laminate, sense of feel, cushioning property and recyclability of the obtained automobile interior trim material were investigated according to the following methods. The results are shown in Table 3.

(1) Melt Bonding Ratio

Evaluation was carried out based on similar appraisal criteria, and using a similar method to Example 1.

(2) Adhesiveness to the Laminate

Evaluation was carried out based on similar appraisal criteria and using a similar method to Example 1.

(3) Sense of Feel

As a conventional automobile trim material, an article obtained by the sequential lamination of a needle punch non-woven fabric made of polypropylene fibers (thickness 2 mm), a soft polyurethane foam sheet (expansion ratio 8, thickness 8 mm) and an ABS resin sheet (thickness 2 to 3 mm) was prepared (below referred to as Conventional Product A).

Next, the sense of feel of the obtained automobile interior trim material was investigated by pressing with a finger, compared with said Conventional Product A, and evaluated according to the following appraisal criteria.

(Appraisal Criteria)

A: The obtained automobile interior trim material has clearly a softer and more supple sense of feel compared to the Conventional Product A.

B: The obtained automobile trim material has a slightly softer and more supple sense of feel compared to the Conventional Product A.

C: There is hardly any difference between the sense of feel of the obtained automobile interior trim material and the Conventional Product A.

D: The Conventional Product A has a better sense of feel compared to the obtained automobile interior trim material.

(4) Cushioning Property

On a flat part of the skin side of each of the obtained automobile interior trim material and the Conventional Product A, a steel ball of weight 100 g was dropped from a height of 50 cm, and evaluation was made according to the following appraisal criteria.

(Appraisal Criteria)

A: After dropping the steel ball, it bounces higher for the Conventional Product A.

B: After dropping the steel ball, the bouncing level of the steel ball is roughly the same for both the Conventional Product A and the obtained automobile interior trim material.

C: After dropping the steel ball, it bounces higher for the obtained automobile interior trim material.

(5) Recyclability

The recyclability of the obtained automobile interior trim material was evaluated according to the following appraied criteria.

(Appraisal Criteria)

A: Even if the obtained automobile interior trim material is not taken apart from the constructing materials and so forth, recycling is possible as it stands.

B: When the obtained automobile interior trim material is taken apart from the constructing materials and so forth, both can be recycled.

C: Non-recyclable material is included in the obtained automobile interior trim material.

EXAMPLE 12

An automobile interior trim material was obtained in a similar manner to Example 11, except that in place of the laminate used in Example 11, using a laminated sheet of suede tone artificial leather (ECSAINE, Trade Name, made by Toray Industry) made of polyester fibers and a polypropylene extruded foam sheet (expansion ratio 20, thickness 2.5 mm) was used, the artificial leather face of this laminated sheet was stuck by contact onto a flat die, and a rectangular shape-preserving material (length 250 mm, width 750 mm) made of a polypropylene frame (diameter 1.5 mm) was used on the other die.

The physical properties of the obtained automobile interior trim material were investigated similarly to Example 11. The results are shown in Table 3.

TABLE 3

| | Properties of automobile interior trim material | | | | |
|---|---|---|---|---|---|
| | Melt bonding ratio | Adhesiveness to laminate | Sense of feel | Cushioning property | Recyclability |
| Example 11 | A | A | A | A | B |
| Example 12 | A | A | A | A | B |
| Example 13 | A | A | A | A | A |
| Example 14 | A | A | A | A | A |
| Example 15 | A | A | A | A | A |
| Comp. Ex. 7 | B-C | C | A | A | A |
| Comp. Ex. | B-C | C | A | A | A |
| Comp. Ex. | D | D | A | A | B |

EXAMPLE 3

Using a laminate of a pile texture-like sheet (thickness 2 mm) made from polypropylene fibers and a polypropylene resin extruded foam sheet (expansion ratio 20, thickness 3.5 mm) the pile texture-like face of this laminate was stuck by contact onto a flat die. Furthermore, in a slot provided in the interios face of a die B having vapor holes (length 300 mm, width 800 mm, depth 60 mm) was put in and fixed a shape-preserving material of similar form to that used in Example 11, except that the shape-presering Material had a polyolefine resin mounting hook (surface coating: halogenated polypropylene) for fixing a locking screw.

As polypropylene resin pre-expanded particles, EPERAN PP (Trade Name, made by Kanegafuchi Chemical Industry Co., Ltd., expansion ratio 30) was filled in the mold via a feeder. Next, steam (steam pressure 0.5 kg/cm$^2$ G, temperature 109 to 113° C.) was introduced into the Molding chamber through the vapor holes of the die to perform the pre-heating, and then the introduction of the steam was stopped and "murashi" of the pre-expanded particles was carried out for 10 seconds, after which the drain and the steam were removed by suction using a vacuum pump so that the inner pressure of the mold was not more than 260 mm Hg. After this, steam (steam pressure 3.2 kg/cm$^2$ G, temperature 144 to 146° C.) was introduced into the Mold through the die A and the die B, and after maintaining this for 20 seconds, and cooling, the mold was then opened and an automobile interior trim material was obtained.

The physical properties of the obtained automobile interior trim material were investigated similarly to Example 11. The results are shown in Table 3.

EXAMPLE 14

Up to the removal of the drain and the steam of the pre-expanded particles by suction, the procedure of this example was carried out in a similar manner to Example 13, except that EPERAN PP (Trade Name, made by Kanegafuchi Chemical Industry Co., Ltd., expansion ratio 15) was used as the polypropylene resin pre-expanded particles. Next, steam (3.5 kg/cm$^2$ G, temperature 146 to 148° C.) was introduced into the mold from the vapor inlet ports of the dies, and after maintaining this for 20 seconds, and cooling, the Mold was opened and an automobile interior trim material was obtained.

The physical properties of the obtained automobile interior trim material were investigated similarly to Example 11. The results are shown in Table 3.

EXAMPLE 15

A polypropylene resin cellular molded article was obtained in a similar manner to Example 11, except that a flat die was used as the die having vapor holes, and furthermore, a shape-preserving material was not provided on the interior surface of the die. Next, the molded foam face of the obtained cellular molded article and a rectangular shape-preserving material (length 250 mm, width 750 mm) made of a polypropylene frame (diameter 1.5 mm) were stuck together by heating and fusing each bonding face, and an automobile interior trim material was obtained.

The physical properties of the obtained automobile interior trim material were investigated similarly to Example 11. The results are shown in Table 3.

COMPARATIVE EXAMPLE 7

A polypropylene resin cellular molded article was obtained in a similar manner to Example 11, except that after the pre-heating, removal of the drain and the steam by suction was carried out without performing "murashi".

The physical properties of the obtained cellular Molded article were investigated similarly to Example 11. The results are shown in Table 3.

COMPARATIVE EXAMPLE 8

A polypropylene resin molded foam was obtained in a similar manner to Example 13, except that "murashi" (holding in steam) after pre-heating was not carried out.

The physical properties of the obtained Molded form were investigated similarly to Example 11. The results are shown in Table 3.

COMPARATIVE EXAMPLE 9

A polypropylene resin molded foam was obtained in a similar manner to Comparative Example 8, except that pre-heating was not carried out.

The physical properties of the obtained Molded form were investigated similarly to Example 11. The results are shown in Table 3.

As is clearly seen from the results shown in Table 3, according to the production methods of an automobile interior trim material of Examples 11 to 15 of the present invention, even in the case of using an extruded foam sheet which has no gas permeability, it is possible to produce a molded foam from pre-expanded particles and simultaneously unite the molded foam with a laminate with good adhesiveness in a short time. Further more, it is clear that the obtained cellular molded articles have superior melt bonding together of the pre-expanded particles. Further, it can be seen that the automobile interior trim materials obtained by Examples 11 to 15 are simultaneously endowed with an excellent sense of feel, an excellent cushioning property and excellent recyclability. Moreover, because each of the obtained automobile interior trim materials is lightweight, they can sufficiently answer the demand for the weight lightening of automobile constructing parts.

Production methods of a polypropylene resin cellular molded article having a skin of the present invention have been explained above. Next, the polypropylene cellular molded articles having a skin formed by using these production methods are explained with the automobile interior trim material for an example.

Figure 5:
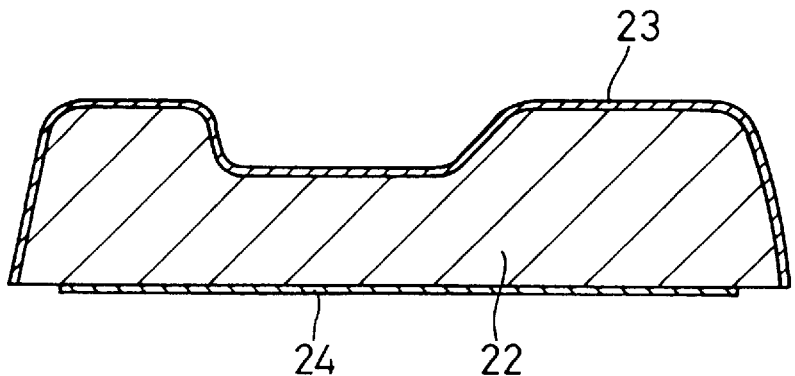
Figure 6:
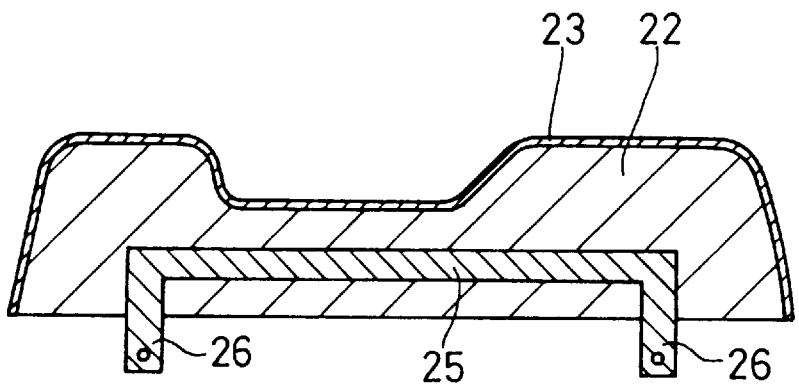
Figure 7:
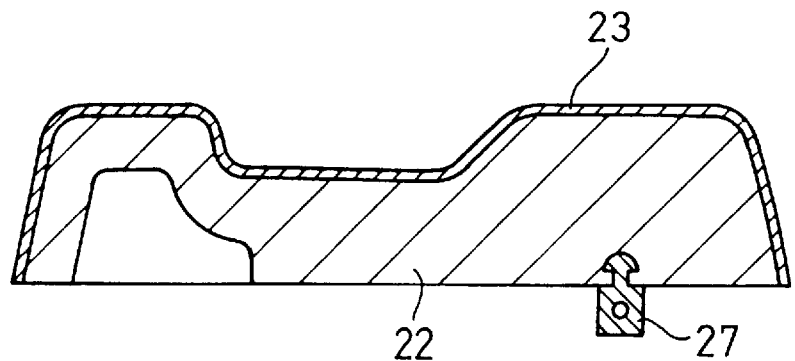

The automobile interior trim material shown in FIG. 5 is constructed by providing a skin material 23 on one face of a molded foam 22 and providing a shape-preserving material 24 on the other face. Either the shape-preserving material 24 may be united with the molded foam 22 during molding, or it may be bonded to the surface after molding the molded foam 22. Furthermore, the automobile interior trim material shown in FIG. 6 is constructed by providing a skin material 23 on one face of a molded foam 22 and embedding a shape-preserving material 25 in the other side. This shape-preserving material 25 is united with the molded foam 22 during molding, and as occasion demands, a mounting part 26 is exposed from the molded foam 22. Moreover, the automobile interior trim material shown in FIG. 7 is constructed by providing a skin material 23 on one face of a molded foam 22 and providing an insert material 27 on the other face. This insert material 27 is united with the molded foam 22 during Molding.

While from the viewpoint of easy recycling, it is most preferable that these shape-preserving materials 24, 25 and the insert material 27 are made of the same polypropylene resin as the material of the molded foam 22, materials other than this may be used, as mentioned before, without imposing any limitations.

Furthermore, a polyolefin resin sheet such as a polypropylene resin sheet, a vinyl chloride resin sheet, a sheet of another resin, a fiber-based sheet, or a resin-impregnated fiber-based sheet, or the like can be used for the skin material 23. From the viewpoint of recycling, it is most preferable that the skin material 23 is made from a polypropylene resin sheet of the same materials as the molded foam 22. Moreover, for the skin material 23, a fiber-based sheet or a resin-impregnated fiber-based sheet is preferably used to give a high-grade feel and so forth. As the skin material 23, a vinyl chloride resin sheet is the most common, but vinyl chloride resin emits a foul odor in a high temperature environment, moreover, it emits noxious goses when burned, and further, there are other points such as difficult recycling, so that from these viewpoints it is not desirable.

Figure 8:
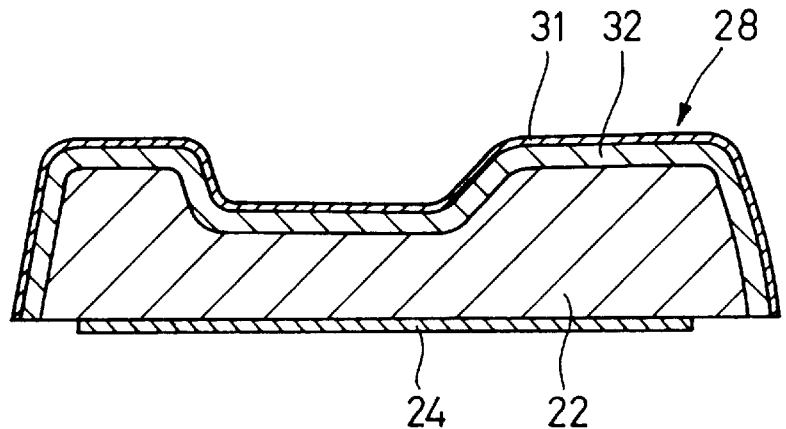
Figure 9:
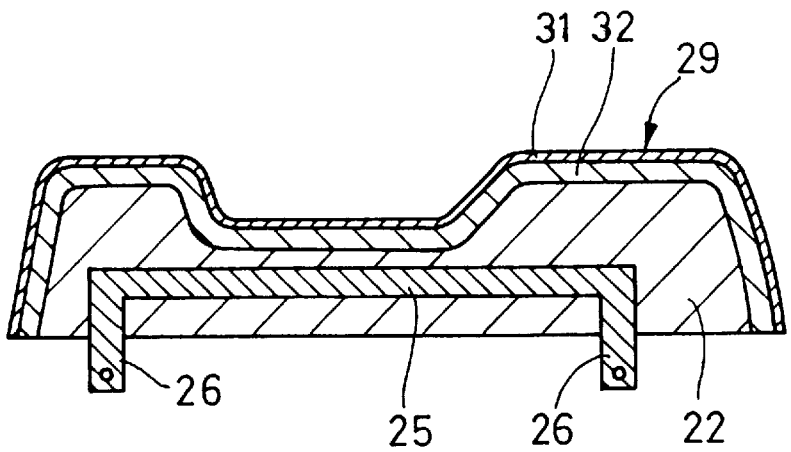
Figure 10:
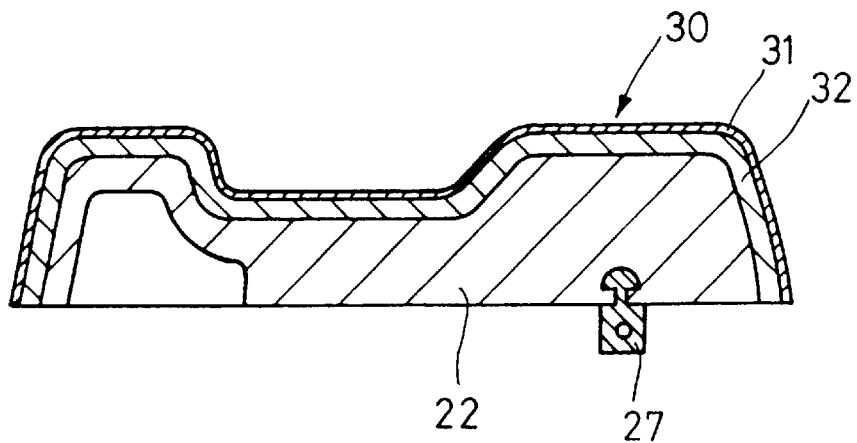

Next, almost similarly to the above-mentioned example, the automobile interior trim material shown in FIG. 8 is constructed by providing a skin material 28 on one face of a molded foam 22 and providing a shape-preserving material 24 on the other face. Furthermore, the automobile interior trim material shown in FIG. 9 is constructed by providing a skin material 29 on one face of a molded foam 22, and embedding a shape-preserving material 25 in the other side. Moreover, the automobile interior trim material shown in FIG. 10 is constructed by providing a skin material 30 on one face of a molded foam 22 and providing an insert material 27 on the other face.

In each of these automobile interior trim materials, the skin materials 28, 29, 30 is constructed from a laminated sheet comprising a polyolefine resin sheet, such as a polypropylene resin sheet, a vinyl chloride resin sheet, or a sheet of another resin 31 provided at the outer surface, and either a polyolefin resin molded foam sheet 32 or a polypropylene resin extruded foam sheet (32) provided on the inner surface of this resin sheet. From the viewpoint of easy recycling, it is preferred that the material of the skin material 28, 29, 30 constructed respectively from the laminated sheet is the same material as the material of the molded foam 22.

In the laminated sheets constituting the skin materials 28, 29, 30, the polyolefin resin molded foam sheet 32 or the polypropylene resin extruded foam sheet (32) provided on the molded foam 22 side has preferably a higher expansion ratio than the expansion ratio of the molded foam 22. Since the polypropylene resin extruded foam sheet (32) has been explained above, a explanation concerning polyolefin resin molded foam sheet 32 will now be given.

The polyolefin resin molded foam sheet having a large expansion ratio can be obtained by foamed-molding pre-expanded particles of a polyolefin resin. Specific examples of the polyolefin resin include polypropylene, polyethylene, ethylene-propylene copolymer, chlorinated polypropylene, chlorinated polyethylene, ethylene-propylene-butene terpolymer, mixtures theseof, and so forth; however, the scope of the present invention is not limited only to these illustrations. In addition, of these resins, in consideration of recyclability, resistance to heat, and adhesiveness with a polypropylene resin sheet or a polypropylene resin molded foam having a low expansion ratio, polypropylene resins such as polypropylene or ethylene-propylene copolymer are particularly preferred.

In the case when the expansion ratio of said polyolefin resin molded foam sheet having a high expansion ratio is too large, the sense of feel of the obtained automobile interior trim material becomes too soft. Furthermore, in the case when this expansion ratio is too small, there is a tendency for the sense of feel of the obtained automobile interior trim material to be too hard. Accordingly, it is desirable that the expansion ratio is usually from 20 to 50, preferably from 25 to 45, and more preferably from 30 to 40.

Furthermore, in the case when the thickness of said polyolefine resin molded foam sheet is too small, there is a tendency for the cushioning property of the polyolefine resin molded foam sheet to become small. Furthermore, when this thickness is too large, there is a tendency for the sense of feel of the obtained automobile interior trim material to become too soft. Accordingly, it is preferred that this thickness is from 0.5 to 5 mm, and especially preferably from about 1 mm to about 3 mm.

Moreover, in order to bestow sufficient cushioning property of two levels to the obtained polypropylene resin cellular molded article having a skin, it is desired that the difference between the expansion ratio of said polyolefin resin molded foam sheet and the expansion ratio of the polypropylene resin molded foam laminated on the inside of this is not less than 5, and preferably not less than 10.

Figure 11:
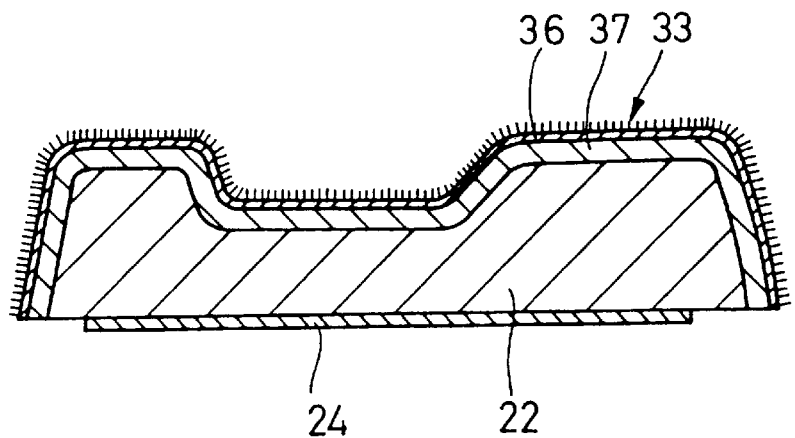
Figure 12:
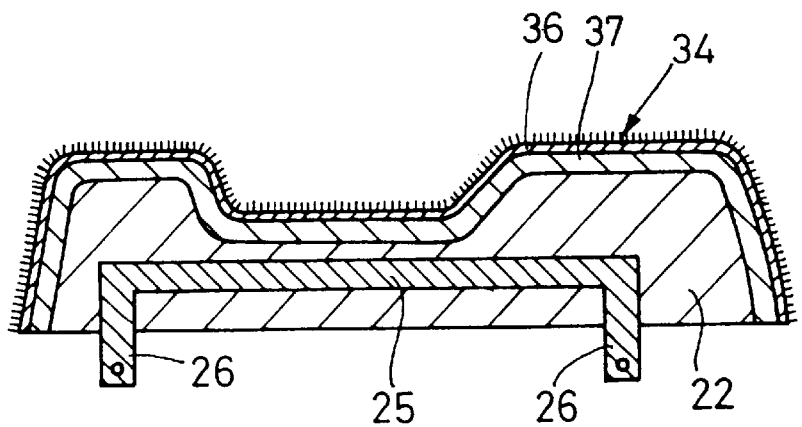
Figure 13:
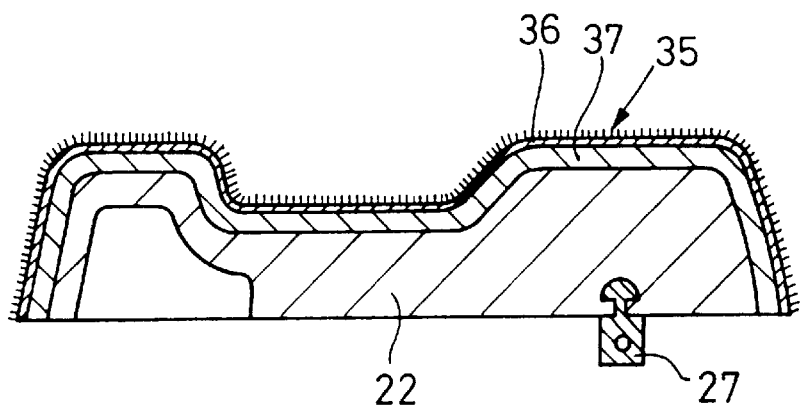

Next, almost similarly to the above-mentioned example, the automobile interior trim material shown in FIG. 11 is constructed by providing a skin material 33 on one face of a molded foam 22, and providing a shape-preserving material 24 on the other face. Furthermore, the automobile interior trim material shown in FIG. 12 is constructed by providing a skin material 34 on one face of a molded foam 22 and embedding a shape-preserving material 25 in the other side. Moreover, the automobile interior trim material shown in FIG. 13 is constructed by providing a skin material 35 on one face of a molded foam 22 and providing an insert material 27 on the other face.

In each of these automobile interior trim materials, the skin material 33, 34, 35 is constructed from a laminated sheet comprising a fiber-based sheet 36 or a resin-impregnated fiber-based sheet (36) provided at the outer surface, and either a polyolefine resin molded foam sheet 37 or a polypropylene resin extruded foam sheet (37) provided on the inner surface of this fiber-based sheet 31. The fiber-based sheet, and so forth, has been explained above.

Articles which have been molded 3-dimensionally beforehand may be used for these skin materials described above, but there is no limitation to these articles. For example, a skin material in the form of a sheet may be put into a mold, and after molding this into the prescribed shape in the mold, the foam may be molded; or the construction may be carried out so that after putting a skin material in the form of a sheet into a mold, pre-expanded particles are filled in, and the skin material is molded simultaneously to forming the foam,.

In addition, the polypropylene resin cellular molded article having a skin is not limited only to an automobile interior trim material, but can also be used for automobile exterior trim materials such as bumpers, cushions of chairs, benches or the like, as well as for applications where weight lightening is necessary, such as aircraft interior trim materials, and so forth. Furthermore, the structure, external appearance, and so forth of the illustrated examples are merely simple illustrations, and naturally there is no limitation to these. In addition, within the scope of the present invention and without deviating from its aim, various kinds of additional improvements, revisions and modifications are possible by the intelligence of one skilled in the art.

Potential for Industrial Application

The polypropylene resin cellular molded article having a skin of the present invention successfully performs a large number of outstanding effects, such as giving a soft and supple sense of feel when pressed, excellent cushioning property, having a feeling of depth, no occurence of foul orders at high temperature, little occurrence of noxious gases when burned, promotion of weight lightening, and moreover, easy recycling.

Furthermore, according to the production method of a polypropylene resin cellular molded article having a skin of the present invention, even when the skin material is not permeable to gas, it is possible to firmly unite said skin material to a molded foam simultaneously to producing the molded foam from pre-expanded particles, and moreover, the thus-obtained cellular molded article shows a superior effect in that even when the thickness of the foam layer is large, for example, from about 200 to about 300 mm, there is no occurrence of poor melt bonding.

Furthermore, the polypropylene resin cellular molded article having a skin such as an automobile interior trim material, obtained by using the production method of this invention successfully performs a large number of outstanding effects, such as having a unique and high-grade feel and soft touch characteristic of the fibrous skin, giving a soft and supple sense of feel when pressed, an excellent cushioning property, a lightweight, and moreover, easy recycling.

We claim:

1. A cellular molded article of a polypropylene resin comprising a polypropylene resin molded foam melt-bonded to a skin, wherein said molded article is obtained by melt-molding pre-expanded particles of polypropylene resin brought into contact with a skin material, said skin material being integrally melt-bonded with the molded foam resulting from melt-molding of the pre-expanded particles to form said cellular molded article having a skin, wherein said skin is not derived from the pre-expanded particles, and wherein the uniting of the skin material to the molded foam takes place simultaneously with the formation of said molded foam.

2. The cellular molded article of a polypropylene resin having a skin described in claim 1 wherein said skin material and said polypropylene resin molded foam are laminated by means of adhesive.

3. The cellular molded article of a polypropylene resin article having a skin of claim 1 or 2, wherein the expansion ratio of said polypropylene molded foam is from 5:1 to 30:1.

4. The cellular molded article of a polypropylene resin having a skin of claim 1 or 2, wherein the cellular molded article further comprises a shape-preserving material.

5. The cellular molded article of a polypropylene resin having a skin of claim 4 wherein said shape-preserving material is bonded to the surface of the polypropylene resin molded foam.

6. The cellular molded article of a polypropylene resin having a skin of claim 4 wherein said shape-preserving material is embedded in the polypropylene resin molded foam.

7. The cellular molded article of a polypropylene resin having a skin of claim 4, wherein said shape-preserving material comprises a mounting part.

8. The cellular molded article of a polypropylene resin having a skin of claim 4, wherein said shape-preserving material comprises a polypropylene resin.

9. The cellular molded article of a polypropylene resin having a skin of claim 1 or 2, wherein the cellular molded article comprises an insert material.

10. The cellular molded article of a polypropylene resin having a skin of claim 1, wherein said skin material is selected from a polyolefin resin sheet, a polyvinyl chloride resin sheet, a fiber-based sheet and a resin-impregnated fiber-based sheet.

11. A cellular molded article of a polypropylene resin having a skin obtained by the method wherein a skin material is placed in the interior of a die A, the die A is clamped with a die B to form a mold, and then the mold is charged with pre-expanded particles of a polypropylene resin, and after supplying steam through vapor holes of the die B to pre-heat the pre-expanded particles at a temperature which is lower than the temperature at which the pre-expanded particles are melt bonded together, the pre-expanded particles are held in steam, and next main heating of the pre-expanded particles is performed through the die B at a temperature which is not less than the temperature at which the pre-expanded particles are melt bonded together.

12. A cellular molded article of a polypropylene resin having a skin obtained by the method comprising the steps of:

placing a skin material in a mold;

charging the mold with pre-expanded particles of a polypropylene resin;

supplying steam to pre-heat the pre-expanded particles at a temperature which is lower than the temperature at which the pre-expanded particles are melt-bonded together;

holding the pre-expanded particles in the steam for a predetermined amount of time; and heating the pre-expanded particles at a temperature which is not less than the temperature at which the pre-expanded particles are integrally melt-bonded together;

wherein said skin is not derived from the pre-expanded particles.

* * * * *